United States Patent
Yamase

(10) Patent No.: US 11,367,418 B2
(45) Date of Patent: Jun. 21, 2022

(54) VEHICLE DISPLAY DEVICE

(71) Applicant: Yazaki Corporation, Tokyo (JP)

(72) Inventor: Takafumi Yamase, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/838,194

(22) Filed: Apr. 2, 2020

(65) Prior Publication Data

US 2020/0320960 A1  Oct. 8, 2020

(30) Foreign Application Priority Data

Apr. 5, 2019  (JP) .............................. JP2019-072896

(51) Int. Cl.
*G09G 5/373*  (2006.01)
*G09G 5/38*  (2006.01)

(52) U.S. Cl.
CPC ............... *G09G 5/373* (2013.01); *G09G 5/38* (2013.01); *G09G 2340/045* (2013.01); *G09G 2340/0442* (2013.01); *G09G 2340/0464* (2013.01); *G09G 2354/00* (2013.01); *G09G 2380/10* (2013.01)

(58) Field of Classification Search
CPC .......... G09G 5/373; G09G 5/38; G03B 21/28; G03B 21/62; G02B 27/0101; G02B 27/01; G02B 27/0149; G02B 5/10; B60K 35/00; B60K 2370/1529; B60K 2370/195
See application file for complete search history.

(56) References Cited

U.S. PATENT DOCUMENTS

| | | | | |
|---|---|---|---|---|
| 9,823,471 | B2* | 11/2017 | Kim | .......................... B60R 1/00 |
| 2011/0052009 | A1* | 3/2011 | Berkovich | ............. G02B 27/01 |
| | | | | 382/106 |
| 2014/0152553 | A1* | 6/2014 | Cha | ........................ G06F 3/0481 |
| | | | | 345/156 |
| 2017/0061696 | A1 | 3/2017 | Li et al. | |
| 2017/0153457 | A1* | 6/2017 | Kunze | .................. H04N 13/322 |
| 2017/0187963 | A1* | 6/2017 | Lee | ..................... H04N 5/23293 |
| 2018/0093676 | A1* | 4/2018 | Emura | ............... G01C 21/3605 |
| 2018/0265002 | A1* | 9/2018 | Kawamoto | ........ H04N 5/23238 |
| 2019/0187790 | A1* | 6/2019 | Woo | ...................... B60W 50/08 |

FOREIGN PATENT DOCUMENTS

| | | |
|---|---|---|
| EP | 3 035 107 A1 | 6/2016 |
| JP | 2006-131103 A | 5/2006 |
| JP | 2009-120080 A | 6/2009 |
| JP | 2014-223824 A | 12/2014 |
| JP | 2017-24444 A | 2/2017 |
| JP | 2017-44629 A | 3/2017 |
| JP | 2018-52281 A | 4/2018 |

* cited by examiner

*Primary Examiner* — Todd Buttram

(74) *Attorney, Agent, or Firm* — Sughrue Mion, PLLC

(57) ABSTRACT

A vehicle display device includes: a projection device which includes a display surface for displaying an image and projects display light via an opening toward a reflection unit disposed to face a driver; an acquisition unit which acquires an eye position of the driver; and a controller which controls the projection device. The controller sets an image display area on the display surface so that the driver is capable of visually recognizing an image to be displayed according to the acquired eye position.

20 Claims, 14 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2019-072896 filed in Japan on Apr. 5, 2019.

BACKGROUND OF THE INVENTION

1. Field of the Invention

The present invention relates to a vehicle display device.

2. Description of the Related Art

Conventionally, there is a vehicle display device that projects display light onto a reflection unit that is disposed to face a driver. Japanese Patent Application Laid-open No. 2009-120080 discloses a vehicle display device that includes a monitor that displays an image and a mirror that reflects the monitor image to display the reflected image to a vehicle occupant.

Here, when the display light is projected toward the reflection unit via an opening, the display light may be blocked if the eye positions of the driver are displaced. As a result, the driver may not be able to visually recognize part of the image.

SUMMARY OF THE INVENTION

An object of the present invention is to provide a vehicle display device capable of expanding a range of eye positions where a driver can visually recognize an entire image.

A vehicle display device according to one aspect of the present invention includes a projection device that includes a display surface for displaying an image and projects display light via an opening toward a reflection unit disposed to face a driver; an acquisition unit that acquires an eye position of the driver; and a controller that controls the projection device, wherein the controller sets an image display area on the display surface so that the driver is capable of visually recognizing an entire image to be displayed according to the acquired eye position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. In addition, this invention is not limited by this embodiment. In addition, constituent elements in the following embodiment include those that can be easily assumed by those skilled in the art or those that are substantially the same.

Embodiment

Figure 1:
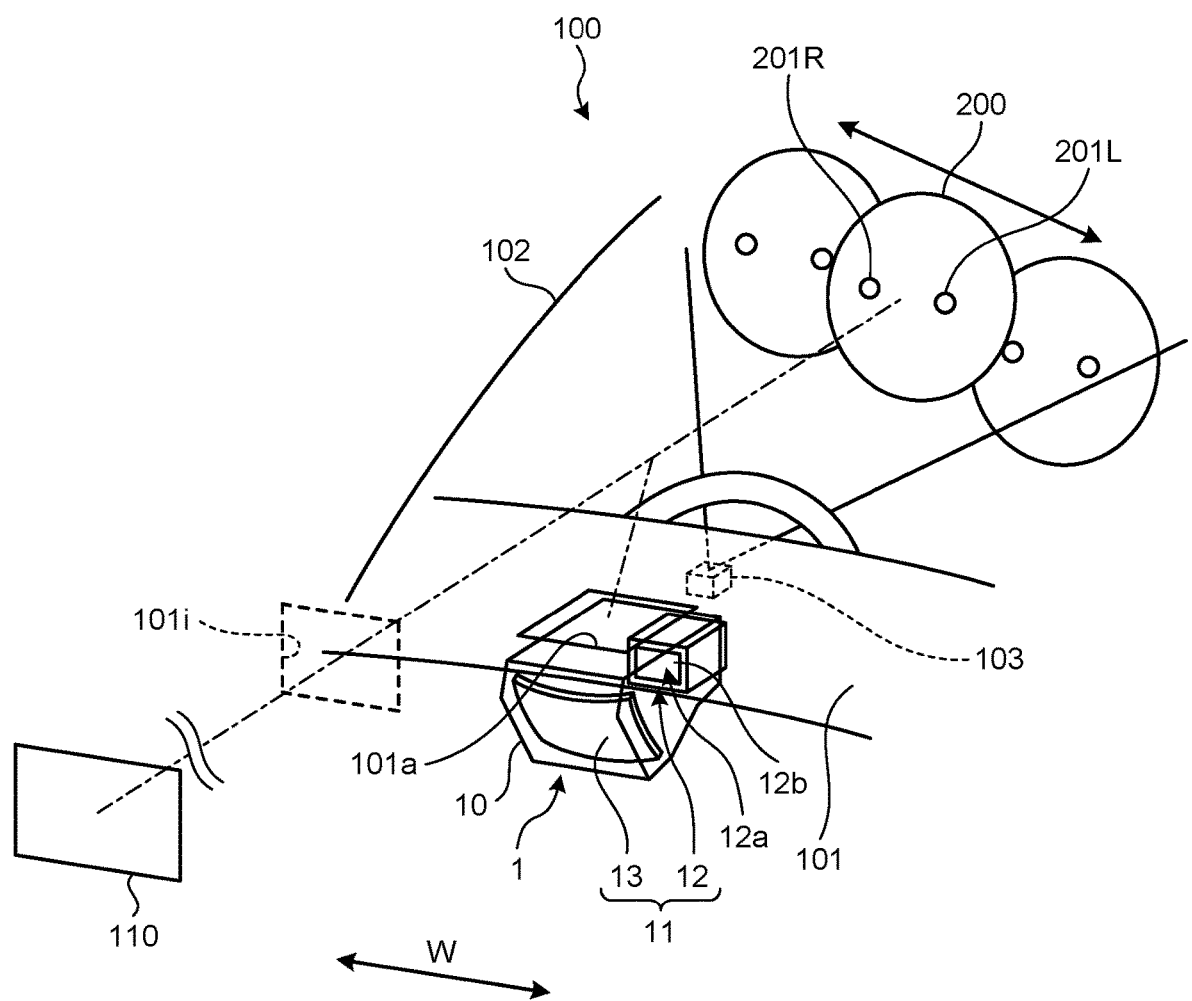
FIG. 1 is a perspective view illustrating a schematic configuration of a vehicle display device according to an embodiment.
Figure 2:
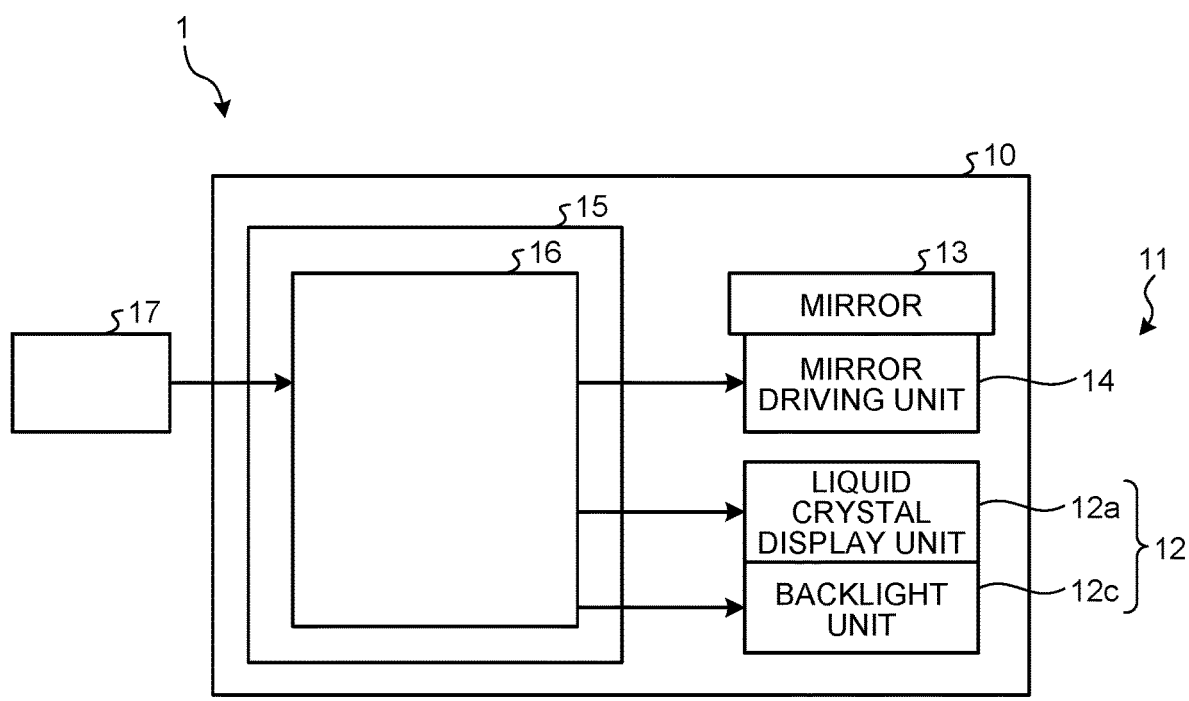
FIG. 2 is a block diagram of the vehicle display device according to the embodiment.
Figure 3:
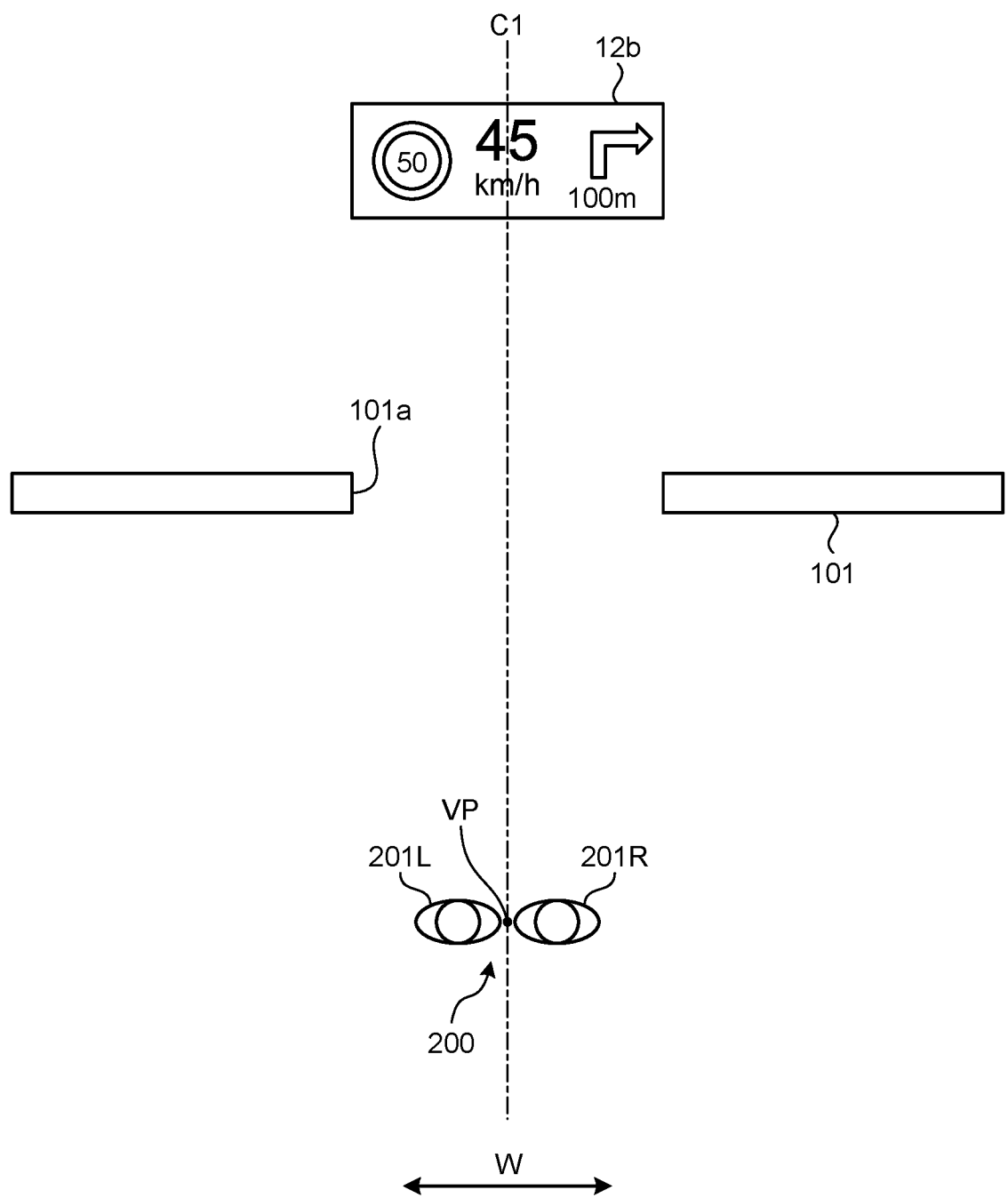
FIG. 3 is a diagram illustrating a simplified optical path from eye positions to the display surface.
Figure 4:
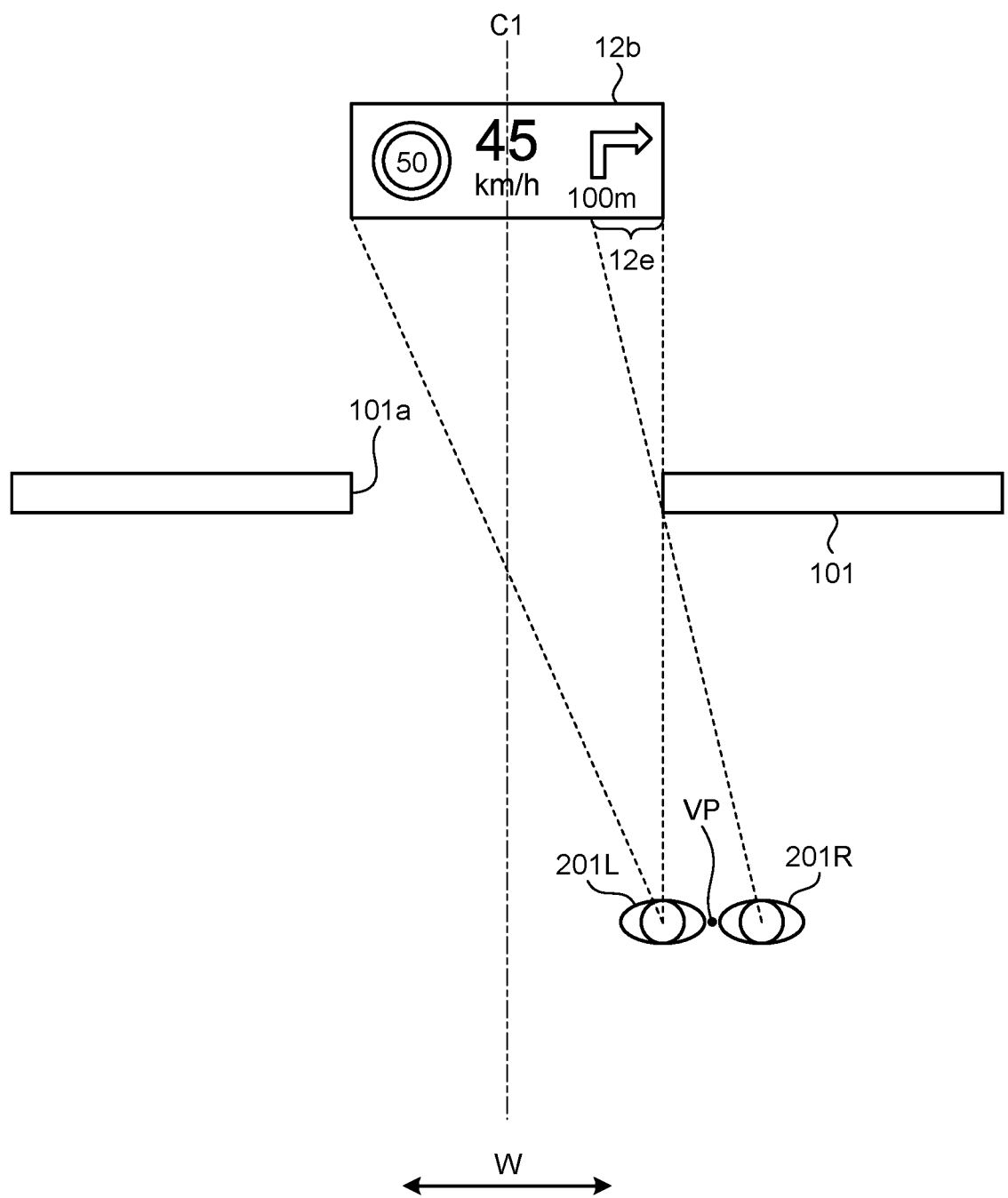
FIG. 4 is a diagram illustrating the eye positions shifted in a right direction.
Figure 5:
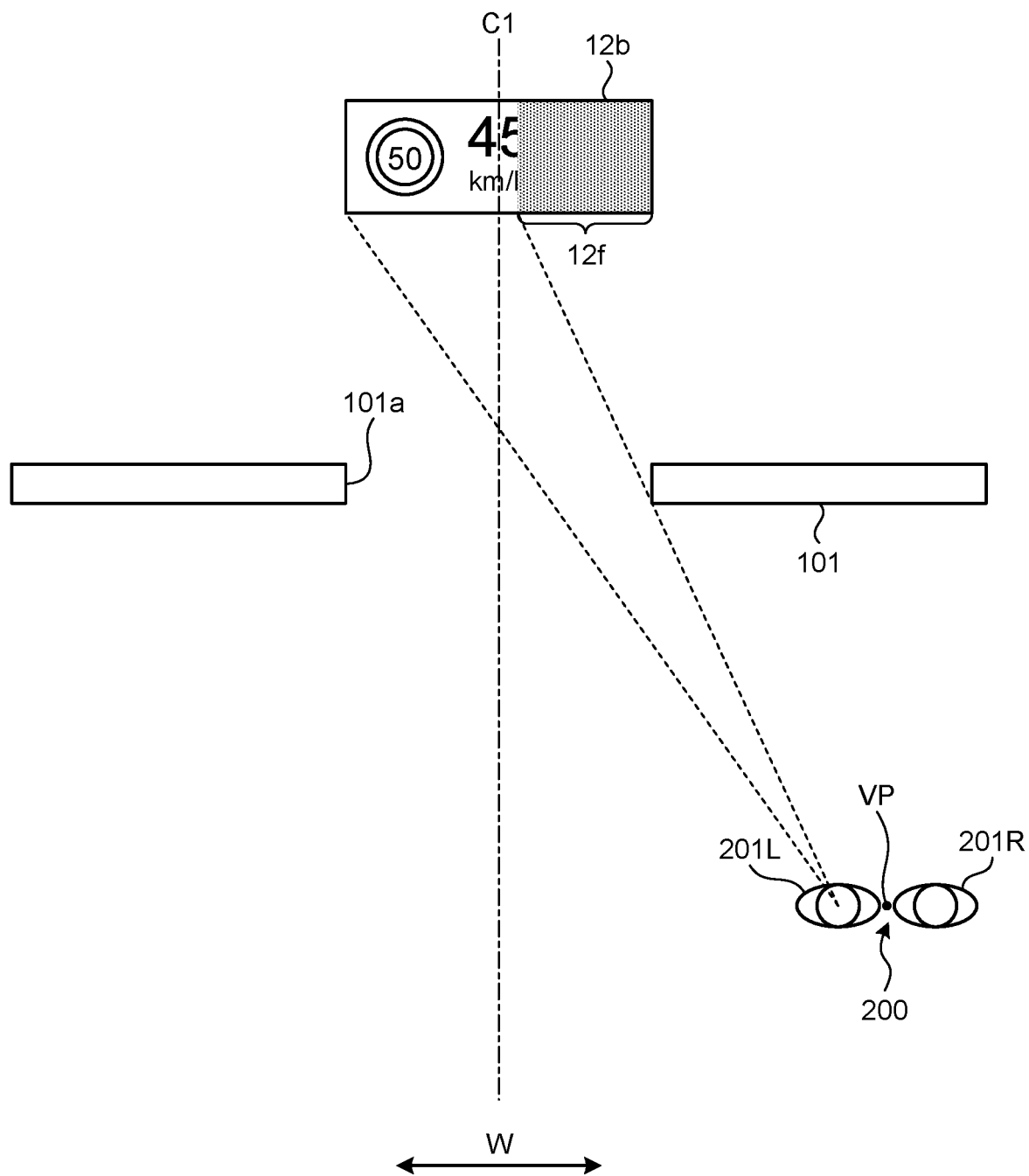
FIG. 5 is another diagram illustrating the eye positions shifted in the right direction.
Figure 6:
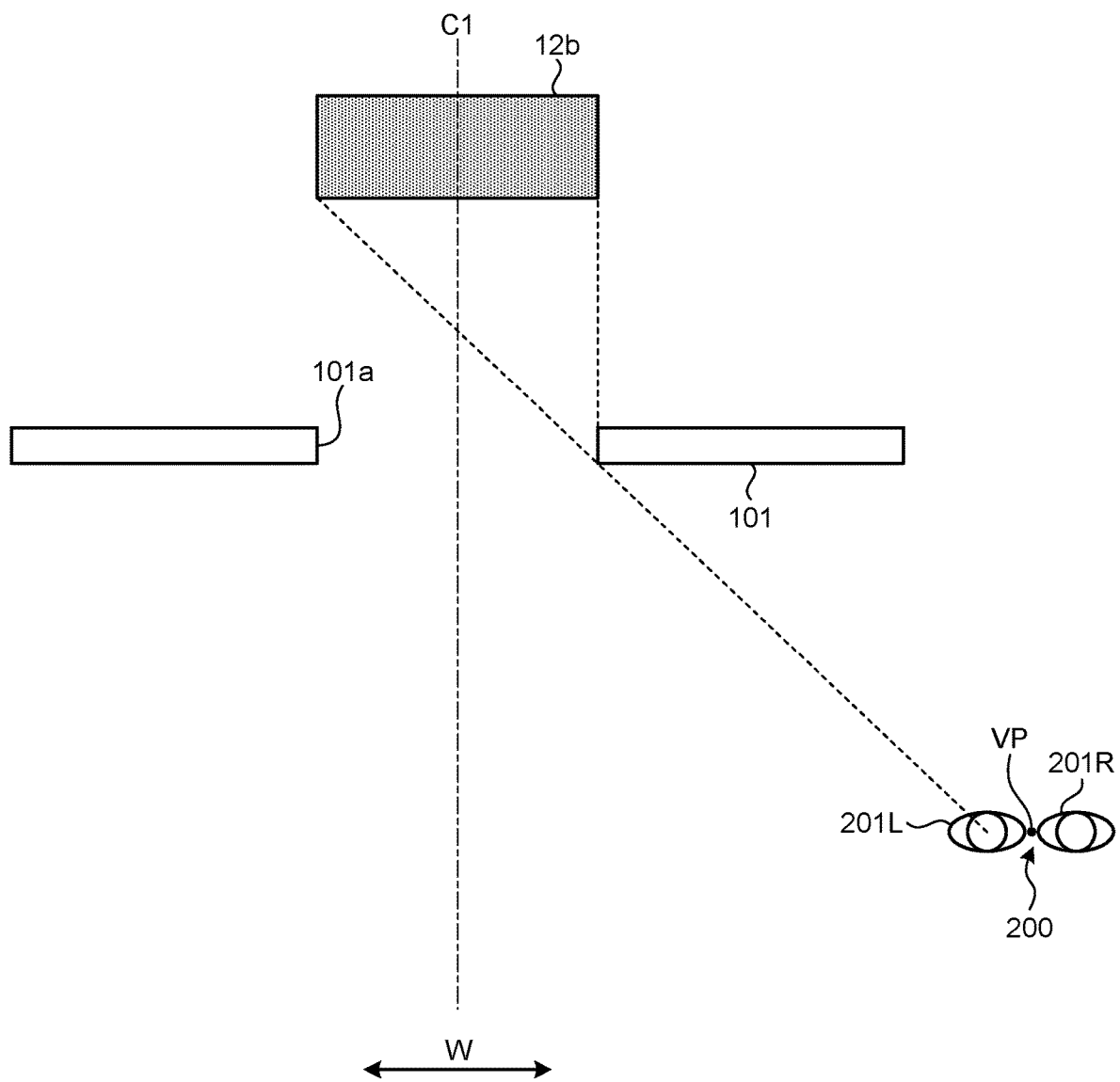
FIG. 6 is a diagram illustrating the eye positions where an image cannot be visually recognized.
Figure 7:
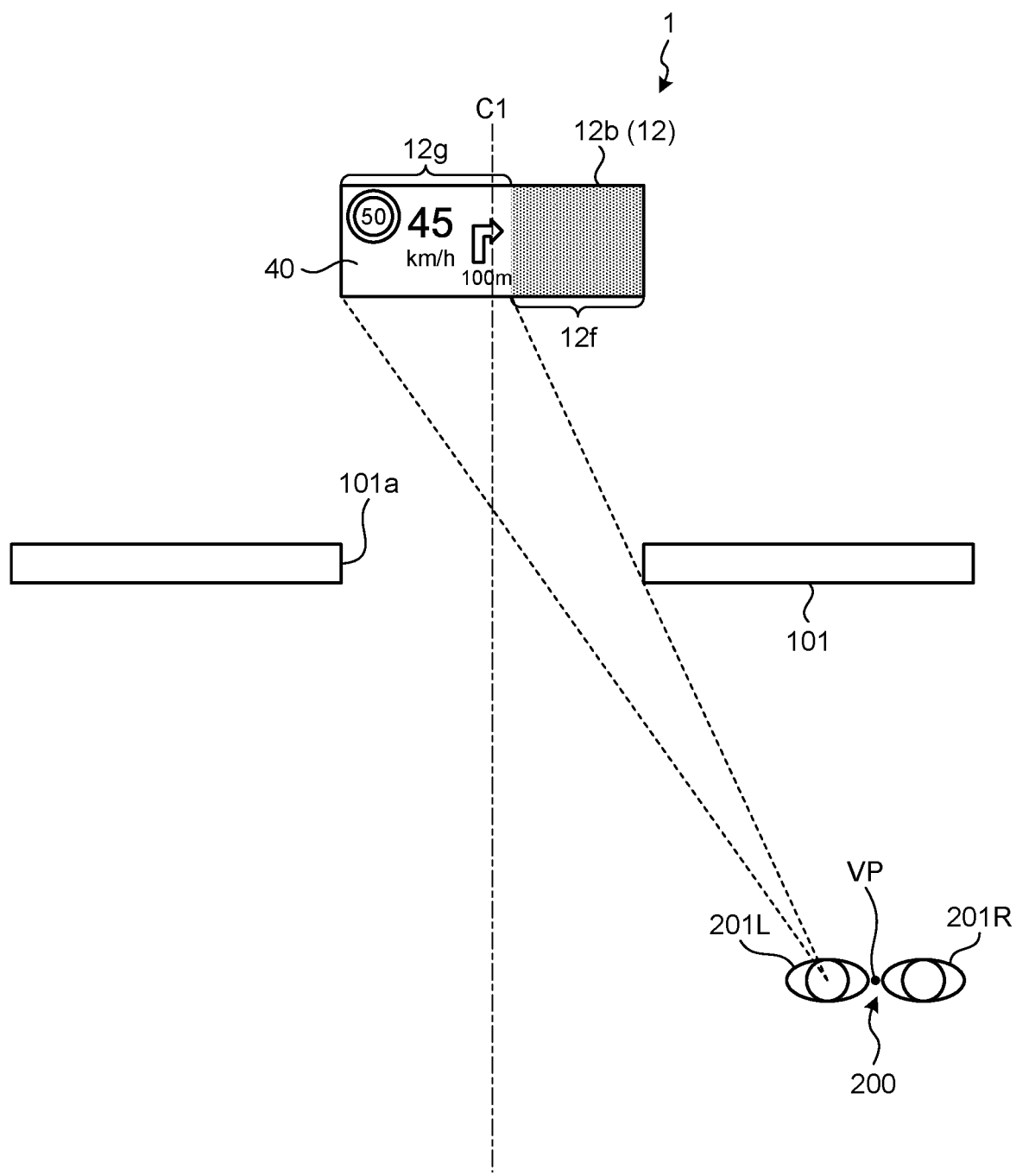
FIG. 7 is a diagram illustrating an image display area according to the embodiment.
Figure 8:
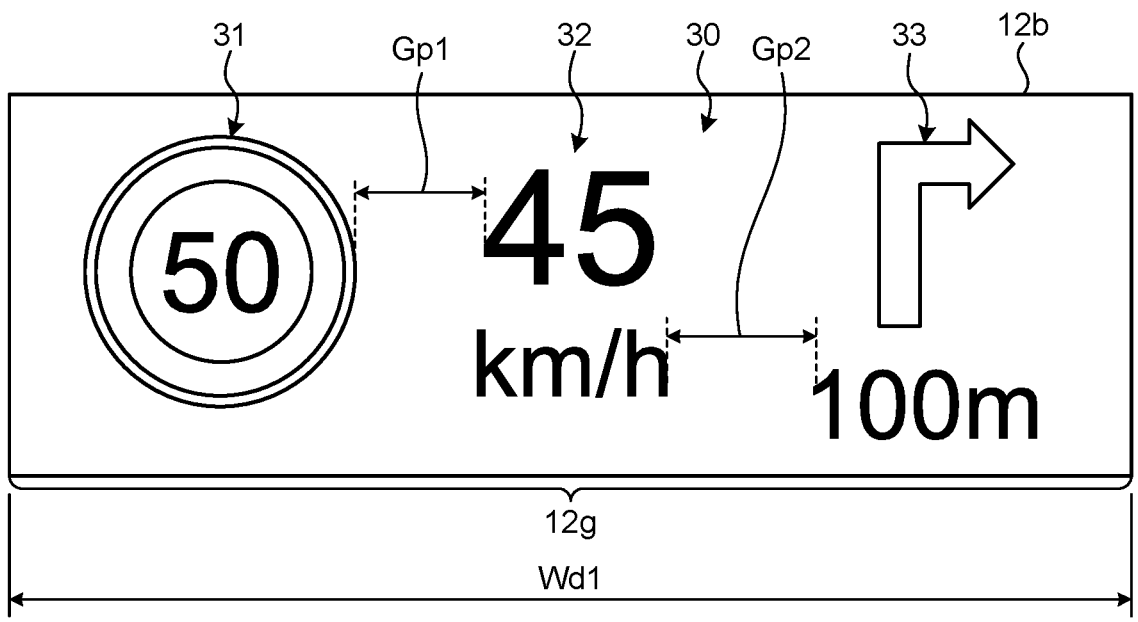
FIG. 8 is a diagram illustrating an image of full screen display.
Figure 9:
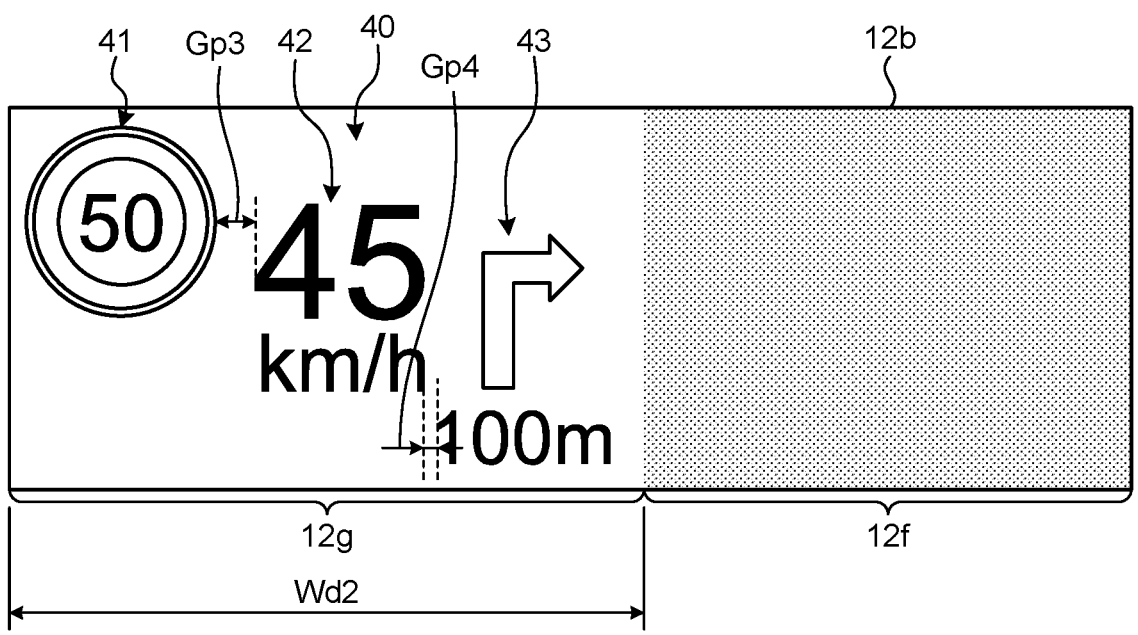
FIG. 9 is a diagram illustrating an image of reduced display.
Figure 10:
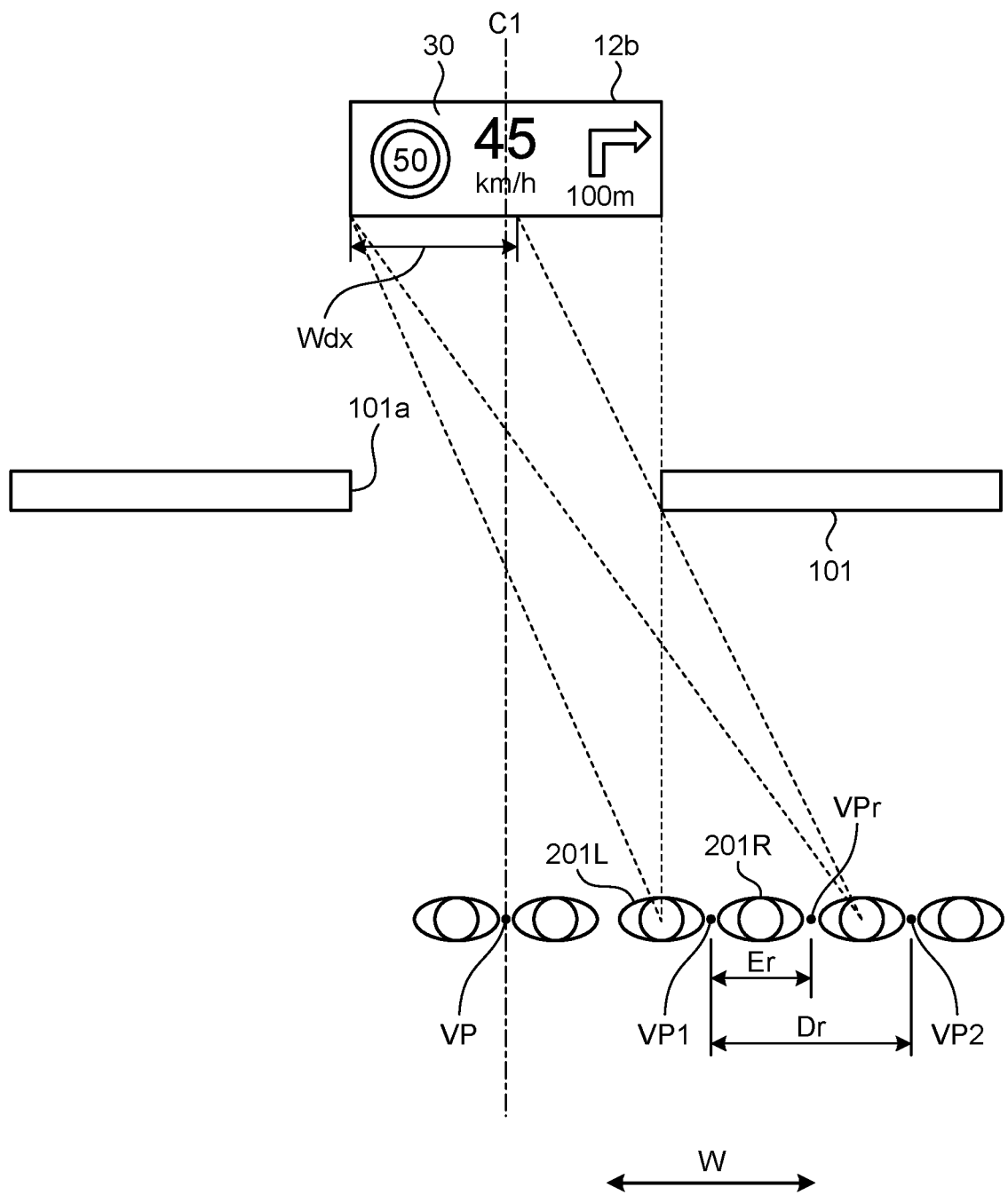
FIG. 10 is a diagram for explaining a limit eye position and a boundary eye position.
Figure 11:
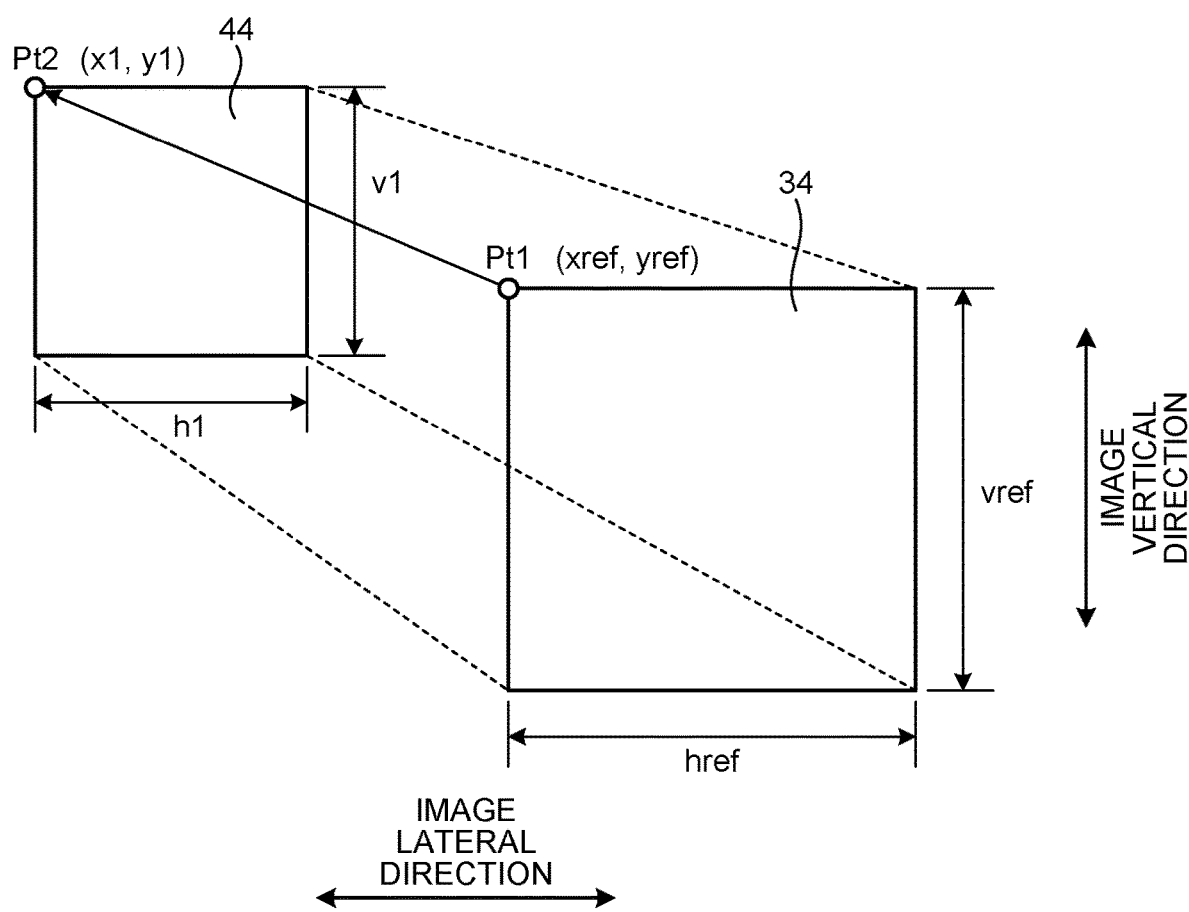
FIG. 11 is an explanatory diagram of a method for calculating the size and position of a design.

The embodiment will be described with reference to FIGS. 1 to 11. This embodiment relates to a vehicle display device. FIG. 1 is a perspective view illustrating a schematic configuration of the vehicle display device according to the embodiment, FIG. 2 is a block diagram of the vehicle display device according to the embodiment, FIG. 3 is a diagram illustrating a simplified optical path from eye positions to the display surface, FIG. 4 is a diagram illustrating the eye positions shifted in a right direction, FIG. 5 is another diagram illustrating the eye positions shifted in the right direction, FIG. 6 is a diagram illustrating the eye positions where an image cannot be visually recognized, FIG. 7 is a diagram illustrating an image display area according to the embodiment, FIG. 8 is a diagram illustrating an image of full screen display, FIG. 9 is a diagram illustrating an image of reduced display, FIG. 10 is a diagram for explaining a limit eye position and a boundary eye position, and FIG. 11 is an explanatory diagram of a method for calculating the size and position of a design.

As illustrated in FIG. 1, a vehicle display device 1 according to the embodiment is a so-called head-up display device. The vehicle display device 1 displays a virtual image 110 in front of a driver 200. As illustrated in FIGS. 1 and 2, the vehicle display device 1 includes a housing 10, a projection device 11, a controller 16, and an acquisition unit 17. The housing 10 of the vehicle display device 1 is disposed inside a dashboard 101 of a vehicle 100. An opening 101a is provided on the upper surface of the dashboard 101. The vehicle display device 1 projects an image onto a windshield 102 through the opening 101a. The shape of the opening 101a is, for example, a rectangle.

The windshield 102 is a reflection unit that is disposed to face the driver 200 in the vehicle 100. The windshield 102 has, for example, translucency, and reflects the light incident from the vehicle display device 1 toward the driver 200 side. The driver 200 recognizes the image reflected by the windshield 102 as the virtual image 110. For the driver 200, the virtual image 110 is recognized as if the virtual image exists ahead of the windshield 102.

In this specification, unless otherwise specified, the "front-rear direction" indicates the vehicle front-rear direction of the vehicle 100 on which the vehicle display device 1 is mounted. Further, unless otherwise specified, "lateral direction W" indicates the vehicle width direction of vehicle 100, and "vertical direction" indicates the vehicle vertical direction of vehicle 100.

The housing 10 of the vehicle display device 1 is formed in a substantially rectangular parallelepiped shape. The housing 10 is fixed inside the dashboard 101. The projection device 11 is disposed, for example, inside the housing 10. The housing 10 has an opening that allows display light projected by the projection device 11 to pass therethrough. The opening of the housing 10 may be closed by a cover or the like that transmits light. The display light that has passed through the opening of the housing 10 travels toward the windshield 102 via the opening 101a of the dashboard 101.

The projection device 11 includes a display device 12 and a mirror 13. The display device 12 of this embodiment is a liquid crystal display device such as a thin film transistor-liquid crystal display (TFT-LCD). The display device 12 includes a light transmissive liquid crystal display unit 12a and a backlight unit 12c. The backlight unit 12c irradiates the liquid crystal display unit 12a with light from behind. Display light is emitted from a display surface 12b of the liquid crystal display unit 12a by the light of the backlight unit 12c.

The mirror 13 is disposed to face the display surface 12b, and reflects the display light emitted from the display surface 12b toward the windshield 102. The display light reflected by the mirror 13 is projected onto the windshield 102 via the opening 101a. That is, the projection device 11 projects the display light toward the windshield 102 through the opening 101a. The mirror 13 of this embodiment is a free-form surface mirror. The mirror 13 is a concave mirror that magnifies display light and reflects the display light toward the windshield 102. In addition, the shape of the reflection surface of the mirror 13 is a shape for correcting the shape of the image so that the image visually recognized by the driver 200 is not distorted.

The mirror 13 of this embodiment is movable. The projection device 11 includes a mirror driving unit 14 that changes the tilt angle of the mirror 13. The mirror driving unit 14 is controlled by the controller 16. For example, the controller 16 adjusts the tilt angle of the mirror 13 in accordance with the eye position VP of the driver 200 acquired by the acquisition unit 17 described later.

The controller 16 controls the display device 12 and the mirror driving unit 14. The controller 16 of this embodiment is disposed on the substrate 15 disposed inside the housing 10. The controller 16 may be a control circuit formed on the substrate 15, or may be a microcomputer or an integrated circuit mounted on the substrate 15. The controller 16 stores a program, and performs the operation of this embodiment in accordance with this program.

The controller 16 controls the liquid crystal display unit 12a and the backlight unit 12c. For example, the controller 16 instructs the liquid crystal display unit 12a to display an image to be displayed on the display surface 12b. Further, the controller 16 sets an image display area 12g (see FIG. 7 or the like) in the liquid crystal display unit 12a. The vehicle display device 1 of this embodiment sets the image display area 12g to an area that can be visually recognized from the driver 200 as will be described below. As a result, the vehicle display device 1 of this embodiment can suppress that the driver 200 cannot visually recognize the displayed information.

The acquisition unit 17 acquires the eye position of the driver 200. The acquisition unit 17 of this embodiment acquires the information on the eye position VP of the driver 200 from a driver monitor 103 disposed in a position capable of photographing the eye of the driver 200 or in a position capable of photographing a part or the whole of the face necessary for estimating the eye positions in a passenger compartment. The driver monitor 103 is disposed in, for example, a meter device, an instrument panel, an overhead console, a pillar, or the like. The driver monitor 103 images the face of the driver 200 from the front. Based on the captured image of the driver 200, the driver monitor 103 detects the eye position of the driver 200, the face direction of the driver 200, and the line-of-sight direction.

The driver monitor 103 detects, for example, the position of a left eye 201L and the position of a right eye 201R of the driver 200 as the eye position VP of the driver 200. The driver monitor 103 may detect the position of the face of the driver 200 as information representative of the eye position VP, or may detect the position between the eyebrows of the driver 200. In the following description, a case where the position between the eyebrows, that is, the intermediate position between the left eye 201L and the right eye 201R is calculated as the eye position VP will be described as an example.

The driver monitor 103 detects the line-of-sight direction and the face direction of the driver 200. The acquisition unit 17 is communicably connected to the driver monitor 103, and acquires information about the eye position VP, the line-of-sight direction, and the face direction of the driver 200 from the driver monitor 103. The acquisition unit 17 provides the acquired information to the controller 16.

The vehicle display device 1 of this embodiment is configured so that the driver 200 can visually recognize the virtual image 110 with both eyes when both eyes of the driver 200 are in a predetermined eye box. The eye box is a space that includes a standard eye position. The vehicle display device 1 is configured so that the driver 200 can visually recognize the entire image displayed on the display surface 12b in a full screen when both eyes at the eye position VP of the driver 200 are in the eye box.

Here, when one eye or both eyes of the driver 200 are removed from the eye box, there is a possibility that a part of the information displayed on the display surface 12b may not be visible from the driver 200 or the visibility of the information may be reduced. Examples of the situation in which the eye position VP of the driver 200 is shifted include a case where the driver 200 feels fatigue, and a case where the driver 200 repeatedly travels at a low speed and stops in a traffic jam. In such a situation, the posture of the driver 200 may be lost, and the eye positions of the driver 200 may be out of the eye box.

In FIG. 3, the optical path from the eye position VP of the driver 200 to the display surface 12b of the display device 12 is simplified and displayed. The actual optical path is bent by being reflected by the windshield 102 and the mirror 13, but in FIG. 3, the optical path is drawn in a straight line. In other words, the optical path illustrated in FIG. 3 is an optical path when the driver 200 views the virtual image 110 through a virtual opening 101*i* illustrated in FIG. 1. The virtual opening 101*i* corresponds to the opening 101*a* of the dashboard 101.

The eye position VP illustrated in FIG. 3 is on a central axis C1 of the optical path of the display light passing from the display device 12 via the opening 101*a*. In this case, the driver 200 can visually recognize the entire image displayed on the display surface 12*b* with both eyes (the left eye 201L and the right eye 201R). If the eye position VP is within a predetermined range in the lateral direction W including the central axis C1, the driver 200 can visually recognize the entire image with both eyes.

The eye position VP illustrated in FIG. 4 is shifted to the right with respect to the central axis C1. In the case of the eye position VP illustrated in FIG. 4, the left eye 201L of the driver 200 can visually recognize the entire image displayed on the display surface 12*b*. On the other hand, the right eye 201R of the driver 200 cannot visually recognize a part of the image displayed on the display surface 12*b*. More specifically, the display light projected from the area 12*e* on the right side of the image on the display surface 12*b* is blocked by the dashboard 101 and does not reach the right eye 201R. That is, the right eye 201R of the driver 200 cannot visually recognize the display light projected from the area 12*e*.

The eye position VP illustrated in FIG. 5 is further shifted to the right than the eye position VP illustrated in FIG. 4. In the case of the eye position VP illustrated in FIG. 5, the left eye 201L of the driver 200 cannot visually recognize a part of the image displayed on the display surface 12*b*. More specifically, the display light projected from the area 12*f* on the right side of the image on the display surface 12*b* is blocked by the dashboard 101 and does not reach either the left eye 201L or the right eye 201R. That is, the driver 200 cannot visually recognize the display light projected from the area 12*f* with any of both eyes.

The eye position VP illustrated in FIG. 6 is further shifted to the right than the eye position VP illustrated in FIG. 5. In the case of the eye position VP illustrated in FIG. 6, the driver 200 cannot visually recognize the image displayed on the display surface 12*b*. More specifically, the display light projected from the display surface 12*b* is blocked by the dashboard 101 and does not reach either the left eye 201L or the right eye 201R.

The vehicle display device 1 of this embodiment sets the image display area 12*g* so that the driver 200 can visually recognize the entire displayed image in the situation illustrated in FIG. 5. Here, the image display area 12*g* is an area in which an image is actually displayed among all areas in which an image can be displayed on the display surface 12*b*. FIG. 7 illustrates the image display area 12*g* set according to the eye position VP. The image display area 12*g* of this embodiment is an area excluding the invisible area 12*f* on the display surface 12*b*. That is, the area excluding the area 12*f* that cannot be visually recognized by both eyes of the driver 200 is set as the image display area 12*g*. The display light projected by the image display area 12*g* reaches at least the left eye 201L of the driver 200. That is, the driver 200 can visually recognize the entire image 40 displayed in the image display area 12*g* with at least the left eye 201L. Thereby, the vehicle display device 1 of this embodiment can expand the range in which the entire displayed image 40 is visible from the driver 200 in the lateral direction W.

Here, an image adjustment method according to the size of the image display area 12*g* will be described. FIG. 8 illustrates an example of an image 30 when the image display area 12*g* is the entire area of the display surface 12*b*.

In this specification, displaying an image using the entire area of the display surface 12*b* as the image display area 12*g* is referred to as "full screen display". FIG. 9 illustrates an example of the image 40 when the image display area 12*g* is a partial area of the display surface 12*b*. The image display area 12*g* in FIG. 9 is reduced in an image lateral direction with respect to the image display area 12*g* in FIG. 8. On the other hand, the height in an image vertical direction in the image display area 12*g* in FIG. 8 is equal to the height in the image vertical direction in the image display area 12*g* in FIG. 9. In the following description, displaying the image 40 with the partial area of the display surface 12*b* as the image display area 12*g* is referred to as "reduced display".

The image 30 illustrated in FIG. 8 includes a sign design 31, a vehicle speed design 32, and a navigation design 33. The image 40 illustrated in FIG. 9 includes a sign design 41, a vehicle speed design 42, and a navigation design 43.

The sign designs 31 and 41 are designs imitating traffic signs. The sign designs 31 and 41 of this embodiment are designs imitating speed limit signs. The sign designs 31 and 41 are displayed on the left side in the image display area 12*g*.

The vehicle speed designs 32 and 42 are designs that indicate the traveling speed of the vehicle 100. The vehicle speed designs 32 and 42 of this embodiment are designs that combine the numbers of traveling speeds and the unit of traveling speed. The vehicle speed designs 32 and 42 are displayed at the center of the image display area 12*g*.

The navigation designs 33 and 43 are designs of navigation information. The navigation designs 33 and 43 of this embodiment are designs that combine an arrow indicating a traveling direction at a branch point and a distance to a branch point. The navigation designs 33 and 43 are displayed on the right side in the image display area 12*g*.

When the image display area 12*g* is restricted to a partial area on the display surface 12*b*, the controller 16 of this embodiment adjusts the size of the design, the gap between the designs, and the display position of the design, and displays all the designs (sign design 41, vehicle speed design 42, navigation design 43) on the image display area 12*g*. More specifically, the controller 16 makes the sizes of the designs 41, 42, and 43 of the image 40 smaller than the sizes of the designs 31, 32, and 33 of the image 30. In other words, when the image display area 12*g* is reduced, the controller 16 reduces the design.

Further, when the image display area 12*g* is reduced, the controller 16 reduces the gap between the designs. More specifically, the controller 16 narrows the gaps Gp3 and Gp4 between the designs in the designs 41, 42, and 43 of the image 40 to be smaller than the gaps Gp1 and Gp2 between the designs in the designs 31, 32, and 33 of the image 30. The gap Gp1 is a gap in the image lateral direction between the sign design 31 and the vehicle speed design 32 in the image 30. The gap Gp2 is a gap in the image lateral direction between the vehicle speed design 32 and the navigation design 33 in the image 30. The gap Gp3 is a gap in the image lateral direction between the sign design 41 and the vehicle speed design 42 in the image 40. The gap Gp4 is a gap in the image lateral direction between the vehicle speed design 42 and the navigation design 43 in the image 40.

The controller 16 makes the reduction degree of the gaps Gp3 and Gp4 with respect to the gaps Gp1 and Gp2 larger than the reduction degree of the image display area 12*g*. That is, the controller 16 reduces the design gap so that the relationship of the following formulas (1) and (2) is satisfied. Here, Wd1 is the horizontal width of the image display area 12*g* related to the image 30, and Wd2 is the horizontal width of the image display area 12g related to the image 40. That is, the controller 16 sets a compression rate for compressing the gap between the designs to a compression rate higher than the compression rate of the image display area 12g.

$$Wd2/Wd1 > Gp3/Gp1 \qquad (1)$$

$$Wd2/Wd1 > Gp4/Gp2 \qquad (2)$$

Further, when the image display area 12g is reduced, the controller 16 may shift the positions of the designs in the image vertical direction. In the image 30 displayed on the full screen, the sign design 31, the vehicle speed design 32, and the navigation design 33 are displayed near the center in the image vertical direction. In addition, the designs 31, 32, and 33 are arranged linearly along the image lateral direction.

In the image 40 of the reduced display, the sign design 41 is displayed on the upper side of the image. On the other hand, the navigation design 43 is displayed on the lower side of the image. The vehicle speed design 42 is disposed at the center in the image vertical direction. That is, the designs 41, 42, and 43 are disposed linearly along the diagonal direction of the image display area 12g. The visibility of each of the designs 41, 42, and 43 improves when the position of each of the designs 41, 42, and 43 has shifted along the image vertical direction. For example, it becomes easier to recognize that the sign design 41 and the navigation design 43 are different designs from the vehicle speed design 42.

A reduction rate when the image display area 12g is reduced in this embodiment will be described. The eye position VP1 illustrated in FIG. 10 is a limit position where the driver 200 can visually recognize the entire image 30 in the full screen display with one eye. In the following description, this eye position VP1 is referred to as "limit eye position VP1". At the limit eye position VP1, the driver 200 can visually recognize the entire image 30 with the left eye 201L, but cannot visually recognize the entire image 30 with the right eye 201R. Further, when the eye position moves to the right side from the limit eye position VP1, the driver 200 cannot visually recognize the entire image 30. The limit eye position VP1 also exists on the left side in the horizontal direction W.

The eye position VP2 illustrated in FIG. 10 is a predetermined boundary position. The vehicle display device 1 of this embodiment reduces the image display area 12g when the eye position VP moves outside the limit eye position VP1. Here, if the image display area 12g is excessively narrow, it is considered that the visibility of the image 40 is lowered. Therefore, a lower limit is set for the horizontal width of the image display area 12g. A lower limit width Wdx illustrated in FIG. 10 is the minimum value of the horizontal width of the image display area 12g. For example, the lower limit width Wdx may be a value that is about half of the horizontal width of the display surface 12b. The eye position VP2 illustrated in FIG. 10 is the boundary eye position VP where the entire image 40 can be visually recognized when the horizontal width of the image display area 12g is the lower limit width Wdx. In the following description, this eye position VP2 is referred to as "boundary eye position VP2". The boundary eye position VP2 is also set on the left side in the horizontal direction W.

In this embodiment, when the acquired eye position VP is a position from the limit eye position VP1 to the boundary eye position VP2, the image is reduced and displayed. In the following description, the eye position VP acquired by the acquisition unit 17 is referred to as "acquired eye position VPr". The acquired eye position VPr corresponds to the actual eye position VP of the driver 200. The distance along the lateral direction W from the limit eye position VP1 to the boundary eye position VP2 is referred to as a maximum movement amount Dr, and the distance along the lateral direction W from the limit eye position VP1 to the acquisition eye position VPr is referred to as an acquired movement amount Er.

The controller 16 calculates a change rate α based on the maximum movement amount Dr and the acquired movement amount Er. The change rate α is a change rate with respect to the size and position of the designs 31, 32, and 33 on the full screen display in the size and position of the designs 41, 42, and 43 on the reduced display. For example, the controller 16 determines the change rate α according to the difference between the acquired eye position VP and line-of-sight direction and the reference eye position VP and line-of-sight direction. The change rate α is calculated by, for example, the following formula (3). Here, α0 is a limit value when the size and position of the design are most changed. For example, the limit change rate α0 is determined so that the width of the image display area 12g becomes the lower limit width Wdx when the acquired eye position VPr is the boundary eye position VP2.

$$\alpha = (Dr - Er)/Dr + \alpha 0 \qquad (3)$$

FIG. 11 illustrates an example of a method for calculating the size and position of the design. In FIG. 11, design 34 is a full screen display design, and design 44 is a reduced display design. The coordinate Pt1 (xref, yref) is the coordinate of the representative position in the design 34 for the full screen display. The coordinate Pt2 (x1, y1) is the coordinate of the representative position in the design 44 for the reduced display. The representative position is, for example, a point closest to the origin in the designs 34 and 44. Note that xref and x1 are coordinate values in the image lateral direction, and yref and y1 are coordinate values in the image vertical direction. In this embodiment, the upper left corner of the image is the origin of the coordinate values. Moreover, href and vref are the width in the image lateral direction and the width in the image vertical direction in the design 34 for the full screen display. h1 and v1 are the width in the image lateral direction and the width in the image vertical direction in the design 44 for the reduced display.

The coordinate values x1 and y1 of the coordinate Pt2 are calculated by the following formulas (4) and (5), for example.

$$x1 = \alpha \times xref \qquad (4)$$

$$y1 = \alpha \times yref \qquad (5)$$

Further, the widths h1 and v1 of the design 44 are calculated by, for example, the following formulas (6) and (7).

$$h1 = \alpha \times href \qquad (6)$$

$$v1 = \alpha \times vref \qquad (7)$$

According to the method described with reference to FIG. 11, the image in the image display area 12g can be evenly reduced. Further, by the same method, when the image display area 12g is enlarged, the image in the image display area 12g can be enlarged evenly.

When the image display area 12g is reduced or enlarged, the aspect ratio of the design may be changed. For example, the designs 41, 42, and 43 of the image 40 may be made vertically long or laterally long compared to the designs 31, 32, and 33 of the image 30. In this case, the controller 16 may calculate the width h1 in the image lateral direction by the following formula (8), or may calculate the width v1 in the image vertical direction by the following formula (9). Δ is a correction amount for the change rate α.

$$h1 = (\alpha \pm \Delta) \times href \quad (8)$$

$$v1 = (\alpha \pm \Delta) \times vref \quad (9)$$

When performing reduced display, the controller 16 may change or tilt the aspect ratio of each of the designs 41, 42, and 43 in addition to evenly reducing the designs 41, 42, and 43 with respect to the designs 31, 32, and 33 displayed on the full screen or instead of reducing evenly. For example, when the image display area 12g is reduced in the image lateral direction, the aspect ratio of each of the designs 41, 42, and 43 may be vertically longer than the aspect ratio of each of the designs 31, 32, and 33. The deformation amount of when the design is vertically long and the deformation amount (tilt angle) when the design is tilted may be determined according to the change rate α.

When performing reduced display, the controller 16 may deform and reduce the designs 41, 42, and 43 with respect to the designs 31, 32, and 33 displayed on the full screen or may iconify the designs 41, 42, and 43.

Note that the vehicle display device 1 of this embodiment sets the image display area 12g so that the driver 200 can visually recognize the entire image 40 by the same method as described above even when the eye position VP is shifted to the left side. In this case, the image display area 12g is set except for an invisible area on the left side of the image on the display surface 12b.

As described above, the vehicle display device 1 of this embodiment includes the projection device 11, the acquisition unit 17, and the controller 16. The projection device 11 has the display surface 12b for displaying an image, and projects display light toward the windshield 102 disposed facing the driver 200 via the opening 101a. The acquisition unit 17 acquires the eye position VP of the driver 200. The controller 16 controls the projection device 11.

In accordance with the acquired eye position VP (acquired eye position VPr), the controller 16 sets the image display area 12g on the display surface 12b so that the driver 200 can visually recognize the entire displayed image. According to the vehicle display device 1 of this embodiment, the range of the eye position VP where the driver 200 can visually recognize the entire image 40 can be expanded. In other words, according to the vehicle display device 1 of this embodiment, the driver 200 can visually recognize the entire image 40 from a wider range.

When the display light projected from the partial area 12f on the display surface 12b is invisible to both eyes of the driver 200, the controller 16 of this embodiment sets the area excluding the partial area 12f on the display surface 12b as the image display area 12g. Accordingly, the driver 200 can visually recognize the entire image 40 with at least one eye.

When the image display area 12g is reduced, the controller 16 of this embodiment reduces the gap between the designs included in the image. Thereby, it becomes possible to display a design as large as possible, and the visibility of a design improves.

When the image display area 12g is reduced, the controller 16 may change the aspect ratio of the design included in the image. When the image display area 12g is reduced along the image lateral direction, the aspect ratio of the design may be changed to a value on the vertical side. When the image display area 12g is reduced along the image vertical direction, the aspect ratio of the design may be changed to a value on the lateral side.

When the image display area 12g is reduced, the controller 16 may tilt the design included in the image. For example, some designs among a plurality of designs may be tilted and displayed. By tilting the design, the visibility of the design can be improved.

When the image display area 12g is reduced, the controller 16 may reduce the reduction degree of the design included in the image less than the reduction degree of the image display area 12g. Accordingly, the design can be displayed as large as possible.

When the image display area 12g is reduced, the controller 16 may simplify the design included in the image. The design visibility is improved by simplifying the design.

In the vehicle display device 1 of this embodiment, the direction in which the image display area 12g is reduced is the image lateral direction. In this case, the range of the eye position VP where the driver 200 can visually recognize the entire image 40 can be expanded along the image lateral direction.

When changing the image display area 12g, the controller 16 may reduce or enlarge the image in the image display area 12g evenly. In this case, the image 30 by full screen display and the image 40 by reduced display can be made similar.

The controller 16 may set the image display area 12g on the display surface 12b so that the driver 200 can visually recognize the entire displayed image 40 with at least one eye. That is, the image display area 12g is reduced so that the entire image 40 can be visually recognized by at least one eye. Accordingly, the visibility of the image 40 can be improved by making the image display area 12g as large as possible compared to the case where the image display area 12g is set so that the image can be visually recognized with both eyes.

First Modification of Embodiment

Figure 12:
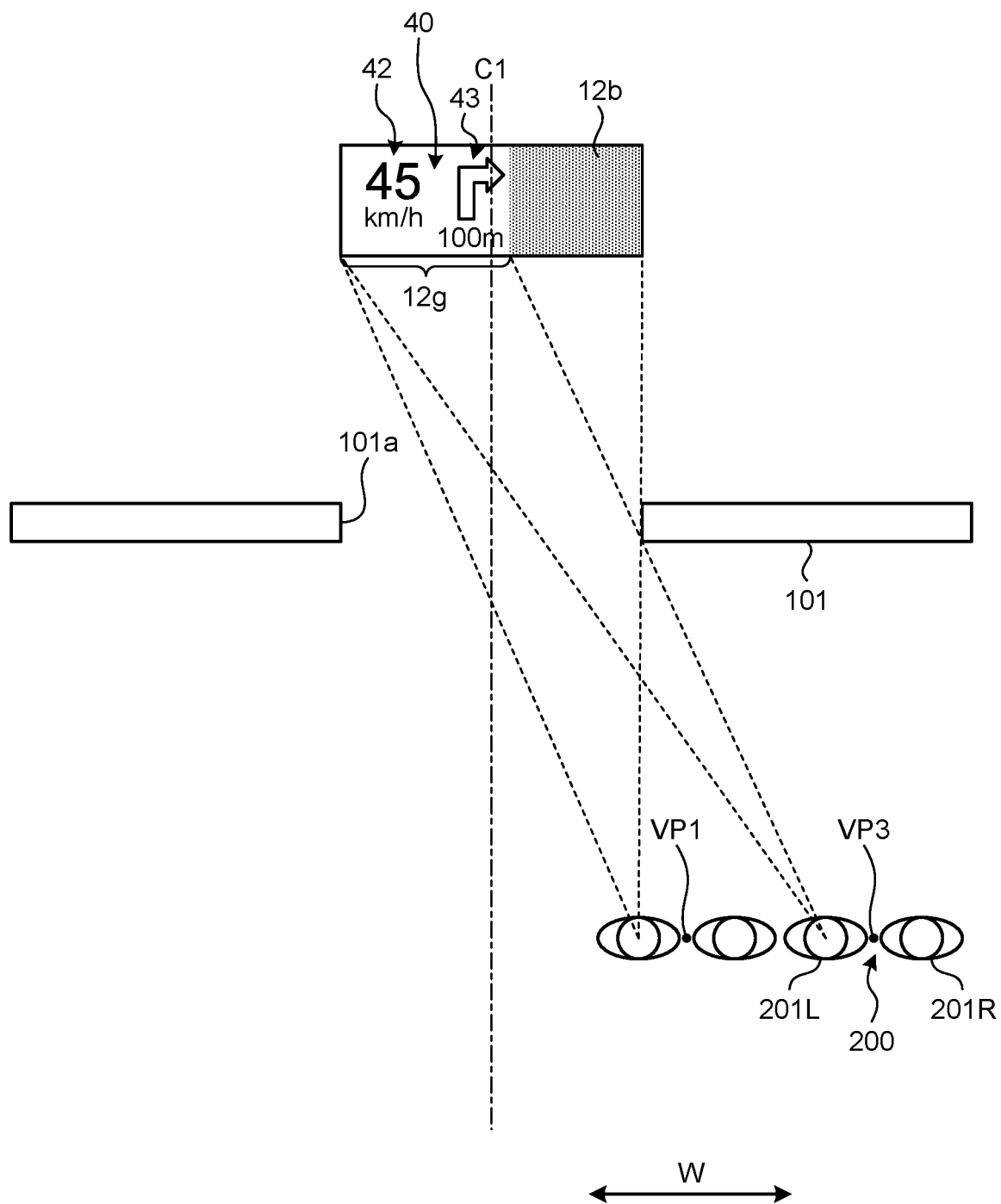
FIG. 12 is a diagram illustrating an image in which some designs are omitted in a first modification of the embodiment.
Figure 13:
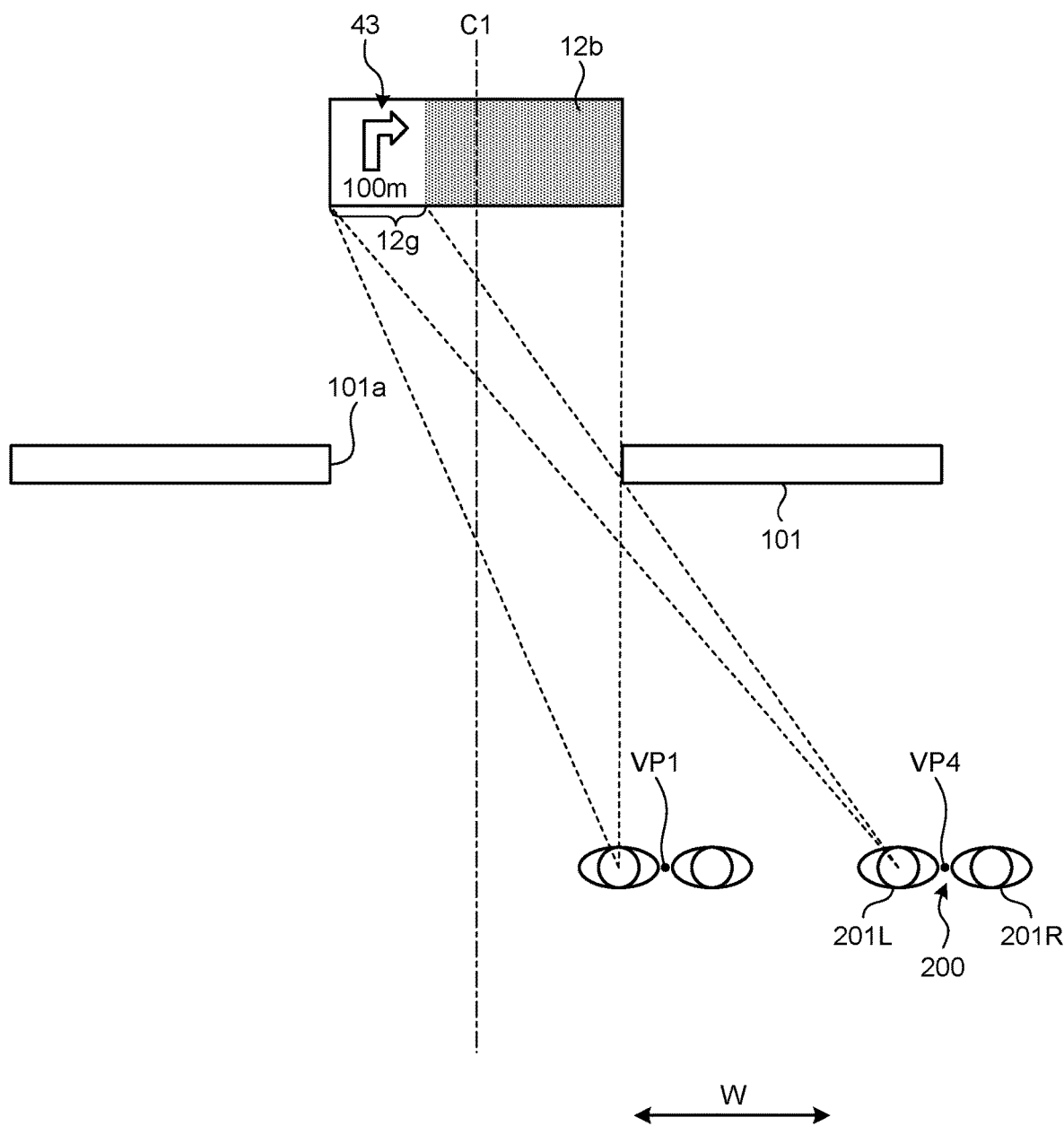
FIG. 13 is another diagram illustrating an image in which some designs are omitted in the first modification of the embodiment.
Figure 14:
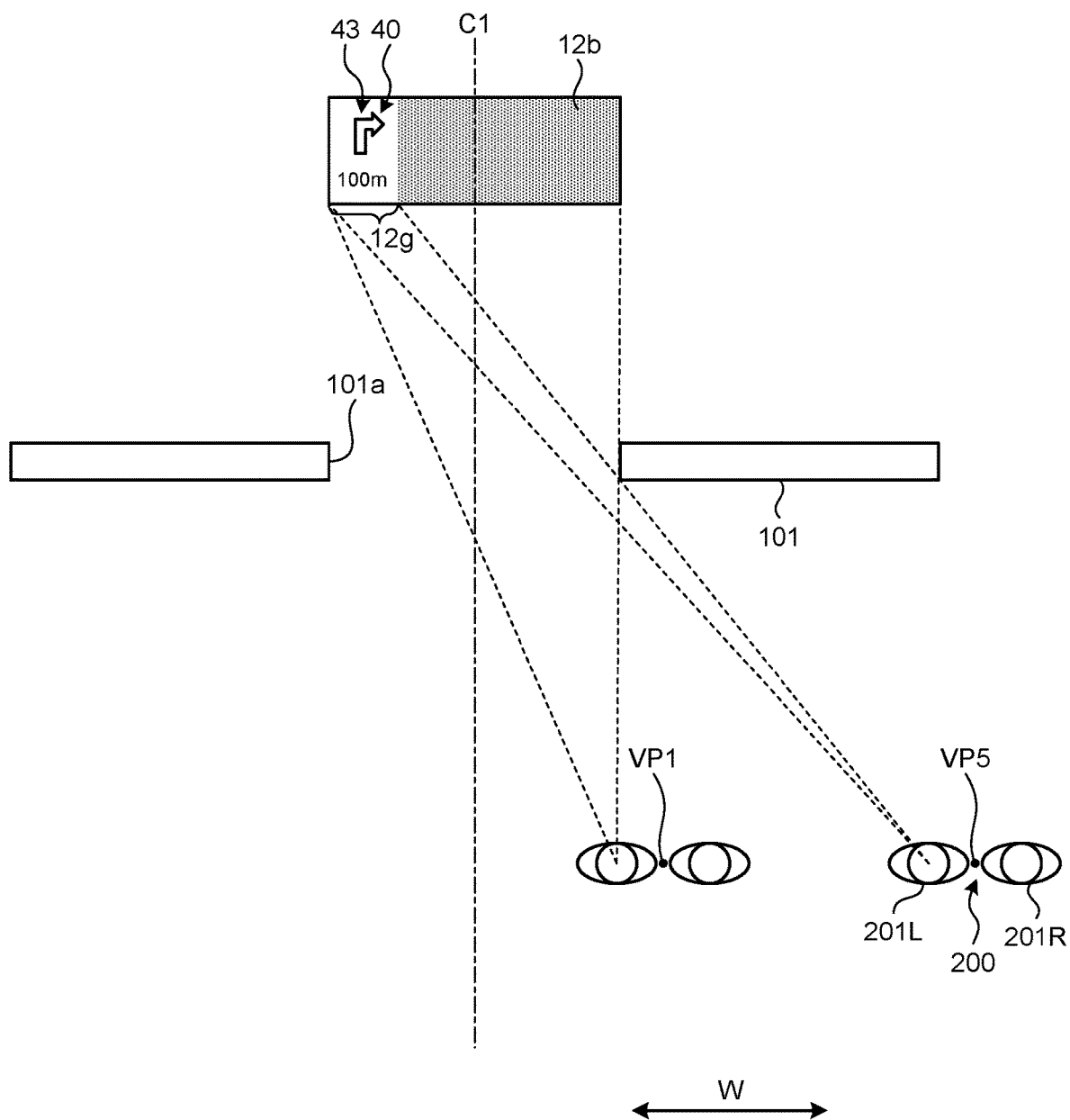
FIG. 14 is a diagram illustrating a reduced design in the first modification of the embodiment.

A first modification of the embodiment will be described. FIG. 12 is a diagram illustrating an image in which some designs are omitted in the first modification of the embodiment, FIG. 13 is another diagram illustrating an image in which some designs are omitted in the first modification of the embodiment, and FIG. 14 is a diagram illustrating a reduced design in the first modification of the embodiment. In the first modification of the embodiment, a point different from the above-described embodiment is that, for example, a design with a low priority is omitted in a reduced display image.

In the first modification of the embodiment, display priority is set to the designs 41, 42, and 43 in the reduced display image 40. Of the three designs 41, 42, and 43, the navigation design 43 has the highest priority, and the sign design 41 has the lowest priority. When performing the reduced display, the controller 16 according to the first modification omits the display of the design having a low priority according to the size of the image display area 12g.

The priorities of the three designs 41, 42, and 43 are determined based on at least one of urgency, importance, and high preference of the driver 200. Of the three designs 41, 42, and 43 displayed by the vehicle display device 1, the design of information having the highest importance may be, for example, the navigation design 43. The navigation design 43 may be an information design having the highest preference of the driver 200 among the three designs 41, 42, and 43. Note that the preference of the driver 200 may be, for example, the frequency with which the driver 200 views the designs 41, 42, and 43 or the length of time for which the designs 41, 42, and 43 are viewed. For example, when the driver 200 most frequently views the navigation design 43 among the three designs 41, 42, and 43, the priority of the navigation design 43 may be set first. Alternatively, when the driver 200 views the navigation design 43 among the three designs 41, 42, and 43 for the longest time, the priority of the navigation design 43 may be set first. Note that the priority order exemplified in this modification is an example.

The eye position Vp3 illustrated in FIG. 12 is an eye position farther from the limit eye position VP1 when viewed from the central axis C1 in the lateral direction W. At the eye position Vp3, the driver 200 cannot visually recognize a part of the display surface 12b. In this case, the controller 16 sets an area on the display surface 12b that is visible to the driver 200 as the image display area 12g. When the image display area 12g is narrow, the controller 16 of the first modification omits display of designs with low priority. Whether or not to omit the display of the design is determined based on, for example, whether or not the image display area 12g has a width large enough to display all the designs 41, 42, and 43.

In the reduced display, the controller 16 of the first modification displays the designs 41, 42, and 43 in principle in the same size as the designs 31, 32, and 33 of the full screen display. In the following description, displaying the designs 41, 42, and 43 in the same size as the designs 31, 32, and 33 displayed on the full screen is referred to as "same-magnification display of design". The controller 16 omits the display of the design with a low priority in order to perform the same-magnification display of the design. For example, the controller 16 determines whether all the designs 41, 42, and 43 can be displayed in the image display area 12g by adjusting the gaps Gp3 and Gp4 (see FIG. 9) between the designs. If all the designs 41, 42, and 43 can be displayed in the image display area 12g, the controller 16 displays the designs 41, 42, and 43 in the image display area 12g.

In addition, when narrowing the gaps Gp3 and Gp4 between the designs, the controller 16 may tilt the designs 41, 42, and 43, or make the positions of the designs 41, 42, and 43 in the vertical direction of the image different from each other, so as to ensure the visibility of each of the designs 41, 42, and 43.

On the other hand, when all the designs 41, 42, and 43 cannot be displayed in the image display area 12g at the same magnification, the controller 16 omits the display of the design with a low priority. For example, the image display area 12g illustrated in FIG. 12 cannot display all the designs 41, 42, and 43 at the same size, but has a width that can display the vehicle speed design 42 and the navigation design 43 at the same size. In this case, the controller 16 displays the vehicle speed design 42 and the navigation design 43 in the image display area 12g at the same magnification, and does not display the sign design 41. That is, the display of the sign design 41 with the lowest priority in the image 40 is omitted. The vehicle display device 1 of the first modification can improve the visibility of the image 40 by limiting the designs to be displayed in this way to the designs 42 and 43 with a high priority.

The controller 16 of the first modification reduces the number of designs displayed in the image display area 12g as the width of the image display area 12g becomes narrower. For example, the eye position Vp4 illustrated in FIG. 13 is located farther from the central axis C1 in the lateral direction W than the eye position Vp3 in FIG. 12. Accordingly, the horizontal width of the image display area 12g illustrated in FIG. 13 is narrower than the horizontal width of the image display area 12g of FIG. 12. In the image display area 12g of FIG. 13, the navigation design 43 can be displayed at the same magnification, but both the vehicle speed design 42 and the navigation design 43 cannot be displayed at the same magnification. In this case, the controller 16 displays the navigation design 43 in the image display area 12g at the same magnification, and omits the display of the sign design 41 and the vehicle speed design 42.

When the width of the image display area 12g is further narrowed, the controller 16 of the first modification reduces the size of the design. The eye position Vp5 illustrated in FIG. 14 is located farther from the central axis C1 in the lateral direction W than the eye position Vp4 of FIG. 13. Accordingly, the horizontal width of the image display area 12g in FIG. 14 is narrower than the horizontal width of the image display area 12g in FIG. 13. The image display area 12g in FIG. 14 does not have a width that allows the navigation design 43 to be displayed at the same magnification. In this case, the controller 16 causes the navigation design 43 to be reduced and displayed in the image display area 12g. The controller 16 adjusts the size of the navigation design 43 to be displayed in the image display area 12g.

The controller 16 may reduce the navigation design 43 at the same ratio along the image vertical direction and the image lateral direction with respect to the navigation design 33 displayed on the full screen. The controller 16 may reduce the navigation design 43 so that the aspect ratio of the navigation design 43 is set to a portrait ratio. The controller 16 may make the reduction degree of the navigation design 43 smaller than the reduction degree of the image display area 12g. In this case, the margin around the navigation design 43 in the image 40 may be narrowed. The controller 16 may simplify the navigation design 43. For example, when the navigation design 43 is reduced, the controller 16 may simplify the shape or the like of the navigation design 43 so that the visibility of the navigation design 43 can be ensured.

As described above, when reducing the image display area 12g, the controller 16 of the first modification of the embodiment makes the number of designs included in the image 40 after the reduction of the image display area 12g smaller than that before the reduction. By reducing the number of designs to be displayed, each design can be displayed while ensuring the size of each design. Therefore, the vehicle display device 1 according to the first modification of the embodiment can suppress a decrease in the visibility of the image 40.

In the first modification of the embodiment, in the priority order of the designs included in the image 40, the position of the navigation design 43 is higher than the positions of the other designs 41 and 42. That is, when the image display area 12g is reduced, information on route guidance of the vehicle 100 is displayed as much as possible. Therefore, the vehicle display device 1 according to the first modification of the embodiment can continue to provide information necessary for the driver 200. Note that the priority order of the designs in the image 40 may be changed according to an instruction from the driver 200, a traveling state of the vehicle 100, or the like.

When the image display area 12g is reduced, the controller 16 may reduce the design with a lower priority while displaying the design with a higher priority in the image 40 at the same magnification. For example, when the vehicle speed design 42 and the navigation design 43 are displayed as illustrated in FIG. 12, the vehicle speed design 42 may be displayed smaller than the vehicle speed design 32 displayed in full screen while the navigation design 43 is displayed at the same magnification. In this case, the vehicle speed design 42 may be made smaller as the image display area 12g becomes smaller. When the image display area 12g is further narrowed and a space for displaying the vehicle speed design 42 cannot be secured, the vehicle speed design 42 is omitted in the image 40.

Second Modification of Embodiment

The designs included in the images 30 and 40 are not limited to the illustrated designs 31, 32, 33, 41, 42, and 43. The images 30 and 40 can include any design. The opening 101a is not limited to the one formed in the dashboard 101. For example, the opening 101a may be formed in the housing 10. The reflection unit disposed to face the driver 200 is not limited to the windshield 102. A combiner or the like may be used as a reflection unit.

The acquisition unit 17 may calculate the eye position VP and the line-of-sight direction based on information acquired from the outside, instead of acquiring the eye position VP, the face direction, and the line-of-sight direction from the outside. For example, the acquisition unit 17 may calculate the eye position VP, the face direction, and the line-of-sight direction based on the face image of the driver 200 acquired from the camera.

The controller 16 may set the image display area 12g so that the driver 200 can visually recognize the entire image 40 with both eyes.

Figure 15:
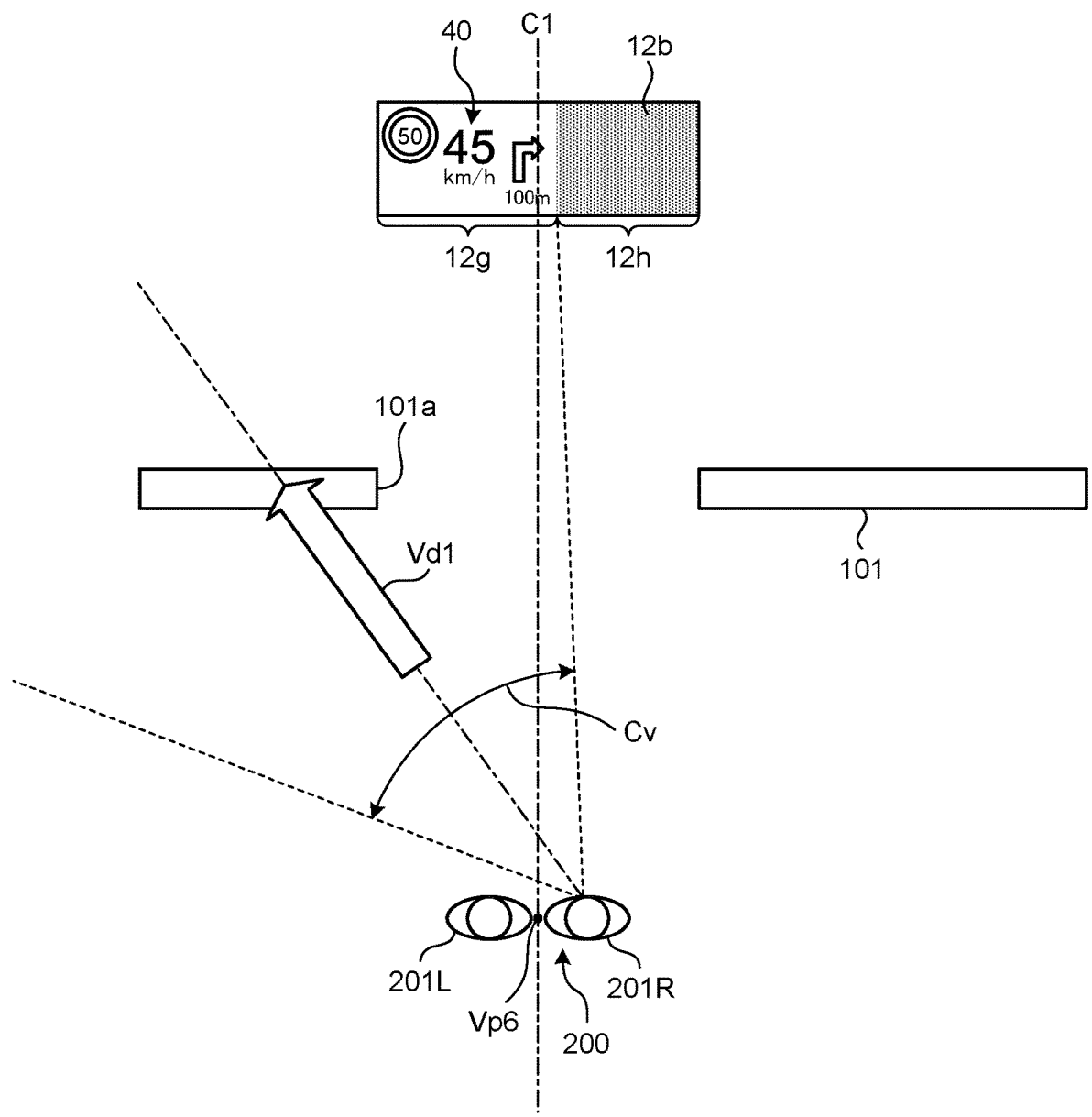
FIG. 15 is a diagram illustrating an image display area in a second modification of the embodiment.

The controller 16 may control display by combining the information on the eye position VP and the line-of-sight direction or the face direction. With reference to FIG. 15, the image display area 12g in the second modification of the embodiment will be described. The eye position Vp6 illustrated in FIG. 15 is a position on the central axis C1. In FIG. 15, a direction Vd1 is a main direction of a center visual field Cv of the driver 200 (hereinafter simply referred to as "main direction"). The main direction Vd1 is, for example, the center line of the center visual field Cv. The center visual field Cv and the main direction Vd1 are estimated based on the line-of-sight direction or the face direction of the driver 200. The main direction Vd1 illustrated in FIG. 15 is tilted to the left with respect to the central axis C1. That is, the driver 200 looks at the left front. On the display surface 12b, a part of the region 12h is outside the range of the center visual field Cv.

The controller 16 according to the second modification example of the embodiment sets the image display area 12g within the range of the center visual field Cv on the display surface 12b. As a result, the entire displayed image 40 is displayed within the range of the center visual field Cv. Therefore, the vehicle display device 1 according to the second modification can improve the visibility of the displayed image 40.

The display device 12 is not limited to a liquid crystal display device. The display device 12 may be, for example, a light emitting diodes (LED) display that generates an image using a large number of LEDs.

The control by the controller 16 is not limited to the control for the eye position VP of the driver 200 outside the eye box. For example, even if the eye position VP of the driver 200 is in the eye box, the controller 16 may control the display position, the display size, and the like according to the eye position VP of the driver 200.

In the case where the eye position VP of the driver 200 is shifted in the vertical direction, the same control as in the above embodiment may be performed. For example, according to the acquired eye position VP, the controller 16 may set the width of the image display area 12g in the vertical direction of the image on the display surface 12b so that the driver 200 can visually recognize the entire displayed image 40.

When the display light projected from a partial area in the vertical direction of the image on the display surface 12b is invisible to both eyes of the driver 200, the controller 16 may set the area excluding the partial area on the display surface 12b as the image display area 12g.

When the image display area 12g is reduced along the vertical direction of the image, the controller 16 may reduce the gap in the vertical direction of the image between the designs included in the image.

The controller 16 may set the position of the image display area 12g in the vertical direction of the image on the display surface 12b so that the driver 200 can visually recognize the entire displayed image 40 with at least one eye.

The acquisition unit 17 may acquire the eye position of the driver 200, the face direction of the driver 200, the line-of-sight direction of the driver 200, and the like from an eye position detector other than the driver monitor 103.

The contents disclosed in the above embodiments and modifications can be executed in appropriate combination.

The vehicle display device according to the embodiment includes the projection device which includes the display surface for displaying an image and projects display light via the opening toward the reflection unit disposed to face the driver, the acquisition unit which acquires the eye position of the driver, and the controller which controls the projection device. The controller sets the image display area on the display surface so that the driver is capable of visually recognizing the entire displayed image according to the acquired eye position. According to the vehicle display device of the embodiment, the image display area is set so that the driver can visually recognize the entire image. Therefore, there is an effect that the range of the eye positions where the driver can visually recognize the entire image can be expanded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a projection device that includes a display surface for displaying an image and projects display light via an opening toward a reflection unit disposed to face a driver;
an acquisition unit that acquires an eye position of the driver to determine a visible area of the display surface that is visible to either or both eyes of the driver; and
a controller that controls the projection device, wherein
the controller sets an image display area on the display surface to correspond to the visible area and, when it is determined that the visible area is visible to only one of the eyes, controls the projection device such that the entire image is displayed on the visible display area so that the only one of the eyes of the driver is capable of visually recognizing the entire image to be displayed according to the acquired eye position.

2. The vehicle display device according to claim 1, wherein
when display light projected from a partial area on the display surface is invisible to any of both eyes of the driver, the controller sets an area excluding the partial area on the display surface as the image display area.

3. The vehicle display device according to claim 1, wherein
when the image display area is reduced, the controller reduces a gap between designs included in the image.

4. The vehicle display device according to claim 2, wherein
when the image display area is reduced, the controller reduces a gap between designs included in the image.

5. The vehicle display device according to claim 1, wherein
when the image display area is reduced, the controller changes an aspect ratio of a design included in the image.

6. The vehicle display device according to claim 2, wherein
when the image display area is reduced, the controller changes an aspect ratio of a design included in the image.

7. The vehicle display device according to claim 3, wherein
when the image display area is reduced, the controller changes an aspect ratio of a design included in the image.

8. The vehicle display device according to claim 1, wherein
when the image display area is reduced, the controller tilts the design included in the image.

9. The vehicle display device according to claim 2, wherein
when the image display area is reduced, the controller tilts the design included in the image.

10. The vehicle display device according to claim 3, wherein
when the image display area is reduced, the controller tilts the design included in the image.

11. The vehicle display device according to claim 5, wherein
when the image display area is reduced, the controller tilts the design included in the image.

12. The vehicle display device according to claim 1, wherein
when the image display area is reduced, the controller makes a reduction degree of the design included in the image smaller than a reduction degree of the image display area.

13. The vehicle display device according to claim 2, wherein
when the image display area is reduced, the controller makes a reduction degree of the design included in the image smaller than a reduction degree of the image display area.

14. The vehicle display device according to claim 3, wherein
when the image display area is reduced, the controller makes a reduction degree of the design included in the image smaller than a reduction degree of the image display area.

15. The vehicle display device according to claim 1, wherein
when the image display area is reduced, the controller simplifies the design included in the image.

16. The vehicle display device according to claim 1, wherein
when the image display area is reduced, the controller makes the number of the designs included in the image after the reduction of the image display area smaller than that before the reduction of the image display area.

17. The vehicle display device according to claim 16, wherein
in a priority order of the designs included in the image, a position of a design of information with high urgency, importance, or driver preference is higher than positions of other designs.

18. The vehicle display device according to of claim 3, wherein
a direction in which the image display area is reduced is an image lateral direction or an image vertical direction.

19. The vehicle display device according to claim 1, wherein
when the image display area is changed, the controller evenly reduces or enlarges an image in the image display area.

20. The vehicle display device according to claim 1, wherein
the controller sets the image display area on the display surface so that the driver is capable of visually recognizing the entire displayed image with at least one eye.

\* \* \* \* \*